US012501559B2

(12) United States Patent
Wang

(10) Patent No.: US 12,501,559 B2
(45) Date of Patent: Dec. 16, 2025

(54) DISPLAY PANEL AND DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventor: Wenqiang Wang, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 178 days.

(21) Appl. No.: 18/498,646

(22) Filed: Oct. 31, 2023

(65) Prior Publication Data

US 2025/0031321 A1 Jan. 23, 2025

(30) Foreign Application Priority Data

Jul. 18, 2023 (CN) .......................... 202310885875.3

(51) Int. Cl.
*H05K 5/02* (2006.01)
(52) U.S. Cl.
CPC ..................... *H05K 5/02* (2013.01)
(58) Field of Classification Search
CPC .... G06F 1/1652; G06F 1/1616; G06F 1/1681; G06F 1/1641; G06F 1/1656; G06F 1/1615; G06F 1/1618; G06F 1/1626; G06F 1/1637; G06F 1/1643; G06F 1/1679; G06F 1/169; H04M 1/185; H04M 1/0214; H04M 1/0268
See application file for complete search history.

(56) References Cited

U.S. PATENT DOCUMENTS

| | | | |
|---|---|---|---|
| 9,348,450 B1* | 5/2016 | Kim | H04M 1/0268 |
| 10,534,406 B2* | 1/2020 | Makinen | G06F 1/1618 |
| 2014/0111954 A1* | 4/2014 | Lee | G06F 1/1641 |
| | | | 361/749 |
| 2015/0077917 A1* | 3/2015 | Song | G06F 1/1652 |
| | | | 361/679.27 |
| 2018/0356860 A1* | 12/2018 | Jung | G02F 1/133305 |
| 2021/0408445 A1* | 12/2021 | Sim | G06F 1/1681 |
| 2022/0068165 A1* | 3/2022 | Park | G06F 1/1616 |
| 2023/0099705 A1* | 3/2023 | Shin | G06F 1/1656 |
| | | | 361/679.01 |

(Continued)

FOREIGN PATENT DOCUMENTS

| WO | WO-2022001907 A1 * | 1/2022 | ........... G06F 1/1652 |
|---|---|---|---|
| WO | WO-2023019644 A1 * | 2/2023 | ............. G09F 9/301 |

*Primary Examiner* — Abhishek M Rathod
(74) *Attorney, Agent, or Firm* — HSML P.C.

(57) ABSTRACT

A display panel and a display device are provided, and the display panel includes two flat parts and a bending part connecting the two flat parts. The display panel has a folded state. In the folded state, the bending part is symmetrical about a first plane, and the two flat parts are symmetrical about the first plane. A distance between an end of each of the two flat parts proximate to the bending part and the first plane is a first distance, a distance between an end of each of the two flat parts facing away from the bending part and the first plane is a second distance, and the first distance is larger than the second distance.

12 Claims, 4 Drawing Sheets

(56) References Cited

U.S. PATENT DOCUMENTS

2023/0240119 A1* 7/2023 Lv .................... G06F 1/1652
2023/0247782 A1* 8/2023 Cao .................. H05K 5/0217
361/807

* cited by examiner

DISPLAY PANEL AND DISPLAY DEVICE

CROSS-REFERENCE TO RELATED APPLICATION

This application claims priority to Chinese Patent Application No. 202310885875.3, filed on Jul. 18, 2023, the disclosure of which is incorporated herein by reference in its entirety.

TECHNICAL FIELD

The present disclosure relates to the field of display technologies, and in particular, to a display panel and a display device.

BACKGROUND

With a development of a display technology of an organic light-emitting diode (OLED) with flexible display characteristics, a market penetration rate of foldable mobile phones has gradually increased, and consumers have a more urgent demand for a portability design of the foldable mobile phones. Thus, a thin design is a key research direction in the portability design of the foldable mobile phones.

The thin design can be achieved through a way of reducing a bending radius in the related art. However, when the bending radius is smaller, an interlayer stress between film layers in a module stack will increase sharply, which increases a risk of interlayer debonding and fracture between the film layers. Especially for a foldable display device in a form of water droplet in a bending state, it is more prone to cause a phenomenon of debonding and failure between film layers at a secondary bending part (i.e., a neck area that forms the water droplet form) of the foldable display device, which is mainly caused by an excessive shear stress borne by film layers in this area.

Therefore, how to reduce the shear stress borne by the film layers in a foldable display panel is an urgent problem to be solved at present.

SUMMARY

According to embodiments of the present disclosure, it is provided a display panel and a display device, which can effectively solve problems of an excessive shear stress borne by film layers and a high risk of debonding and failure between film layers in an existing foldable display panel.

According to a first aspect, it is provided a display panel, and the display panel includes two flat parts and a bending part connected to the two flat parts, the display panel has a folded state, and in the folded state, a section shape of the bending part is a water droplet shape, and the bending part is symmetrical about a first plane, and the two flat parts are symmetrical about the first plane; and a distance between an end of each of the two flat parts proximate to the bending part and the first plane is a first distance, a distance between an end of each of the two flat parts away from the bending part and the first plane is a second distance, and the first distance is larger than the second distance.

Optionally, in the folded state, the section shape of the bending part comprises an arc edge or comprises a combination of the arc edge and a straight edge.

Optionally, the bending part includes a main bending part and two transition bending parts, each of the two flat parts is connected to the main bending part through a corresponding one of the two transition bending parts, and in the folded state, a section shape of the main bending part is arc-shaped.

Optionally, in the folded state, each of the two transition bending parts includes a straight portion, an angle between the straight portion and the first plane is a first angle, an angle between each of the two flat parts and the first plane is a second angle, and the first angle is larger than the second angle.

Optionally, the first angle is in a range of 9 degrees (°) to 14°, and the second angle is in a range of 0.4° to 0.6°.

Optionally, each of the two transition bending parts includes a first curving portion and a second curving portion, the first curving portion is connected to the main bending part and the straight portion, and the second curving portion is connected to the straight portion and a corresponding one the two flat parts; and a bending center of the first curving portion and a bending center of the second curving portion are located at different sides of the transition bending parts, respectively.

Optionally, the section shape of the main bending part is a half round, and the bending center of the first curving portion is the same as a bending center of the main bending part.

Optionally, the main bending part includes a first supporting layer, each of the two transition bending parts includes a second supporting layer, each of the two flat parts includes a third supporting layer, the first supporting layer, the second supporting layer and the third supporting layer are disposed on a same layer; and the first supporting layer includes multiple through holes, and the second supporting layer includes multiple grooves.

According to a second aspect, it is provided a display device, and the display device includes anyone of the above display panels, in which the display device further includes two front frames spaced apart, each of the two front frames includes a first part, and the first part is arranged to be overlapped with a corresponding one of the two flat parts; and a thickness of an end of the first part proximate to the bending part is a first thickness, a thickness of an end of the first part away from the bending part is a second thickness, and the first thickness is larger than the second thickness.

Optionally, a difference between the first thickness and the second thickness is equal to a difference between the first distance and the second distance, and the display device further includes a hinge; in the folded state, a thickness of the display device gradually decreases in a first direction, and the first direction is a direction of the hinge facing towards an edge of the display device.

Optionally, each of the two front frames includes a second part and a connection part, and the first part is rotatably connected to the second part through the connection part.

Optionally, the display device includes middle frames, sides of the middle frames facing towards the two front frames define accommodation grooves, the accommodation grooves respectively accommodate resilient supporting members therein, and the resilient supporting members are arranged to be overlapped with the first parts.

According to embodiments of the present disclosure, it is provided the display panel and the display device, and the display panel includes: the two flat parts and the bending part connected to the two flat parts, the display panel has the folded state; in the folded state, the bending part is symmetrical about the first plane, the two flat parts are symmetrical about the first plane; and the distance between the end of each of the two flat parts proximate to the bending part and the first plane is the first distance, the distance between the end of each of the two flat parts away from the bending part and the first plane is the second distance, and the first distance is larger than the second distance. In the display panel and the display device provided in the present disclosure, the distance between the end of each of the two flat parts proximate to the bending part and the first plane is larger than the distance between the end of each of the two flat parts away from the bending part and the first plane, thus the two flat parts can form a wedge-shaped structure, a thickness of a side of the wedge-shaped structure proximate to the bending part is thicker, and a thickness of a side of the wedge-shaped structure away from the bending part is thinner, so as to decrease a shear stress between film layers in the display panel, and reduce a peeling risk of film layers.

BRIEF DESCRIPTION OF THE DRAWINGS

In order to clearly describe technical solutions in embodiments of the present disclosure, drawings used in the embodiments of the present disclosure will be simply described. Apparently, the drawings descried below are merely some of the embodiments of the present disclosure, based on the drawings, other drawings can be obtained by those skilled in the art without involving creative labors.

Figure 1:
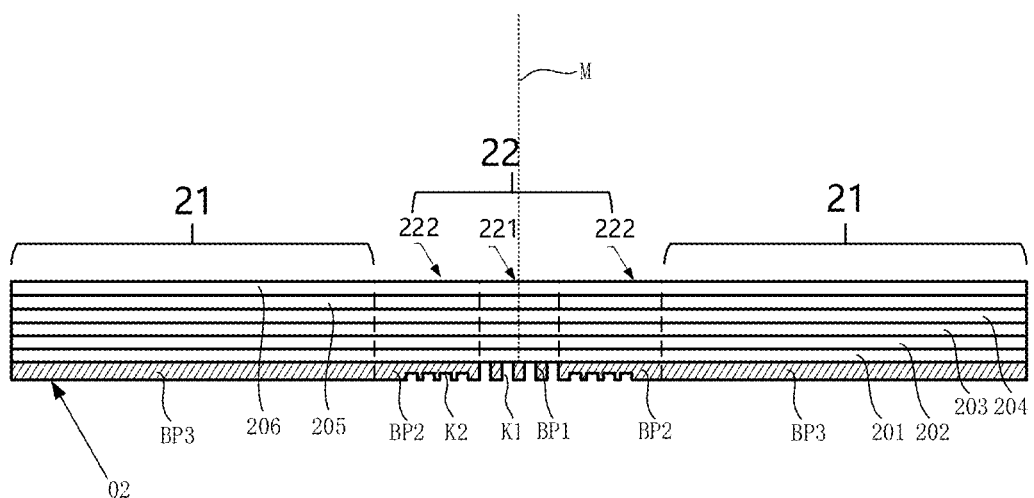
FIG. 1 is a section diagram of a display panel in an unfolded state provided in an embodiment of the present disclosure.

LIST OF REFERENCE NUMBERS display device 01; display panel 02; flat part 21; bending part 22; main bending part 221; transition bending part 222; straight portion 2221; first curving portion 2222; second curving portion 2223; front frame 03; first part 31; second part 32; connection part 33; middle frame 04; accommodation groove 41; resilient supporting member 42; hinge 05; first plane M; first distance d1; second distance d2; misalignment distance d3; first angle θ1; second angle θ2; first supporting layer BP1; second supporting layer BP2; third supporting layer BP3; first optical adhesive layer 201; display panel body 202; second optical adhesive layer 203; polarizer 204; third optical adhesive layer 205; protective cover plate 206; through hole K1; groove K2; first thickness T1; second thickness T2; first direction X.

DETAILED DESCRIPTION

Technical solutions in embodiments of the present disclosure will be clearly and completely described below in conjunction with accompanying drawings in the embodiments of the present disclosure. Apparently, the described embodiments are merely some of the embodiments of the present disclosure, not all of them. Based on the embodiments in the present disclosure, all other embodiments obtained by those skilled in the art without making creative efforts fall within a scope of protection of the present disclosure. Moreover, it should be understood that the specific embodiments described here are only used to describe and explain the present disclosure, and are not used to limit the present disclosure. In the present disclosure, without any explanation to the contrary, directional terms used herein such as "upper" and "lower" usually refer to the upper and lower positions of a device in an actual use or working state, specifically the direction of the figures of the accompanying drawings, and terms "inner" and "outer" refer to a profile of the device.

The following disclosure provides many different embodiments or examples for implementing different structures of the present disclosure. In order to simplify the present disclosure, the following will describe components and settings of specific examples. Apparently, they are merely examples and are not intended to limit the present disclosure. Moreover, the present disclosure may repeat reference numbers and/or reference letters in different examples, a purpose of this repetition is to simplify and clarify, and it does not in itself indicate that relationship between various discussed embodiments and/or settings. Furthermore, the present disclosure provides various examples of specific processes and materials, those skilled in the art can also realize applications of other processes and/or uses of other materials. The following are described in detail, it should be noted that the description order of the following embodiments does not limit the preferred order of the embodiments.

Figure 2:
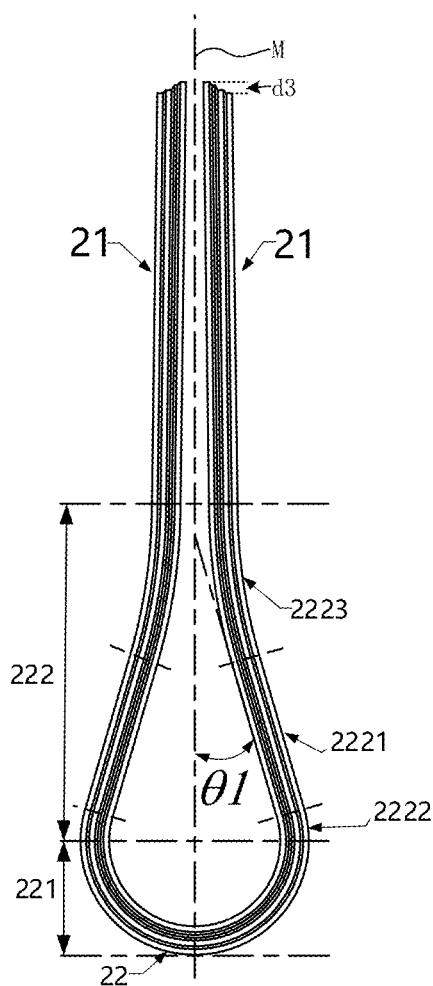
FIG. 2 is a section diagram of the display panel in a folded state provided in the embodiment of the present disclosure.
Figure 3:
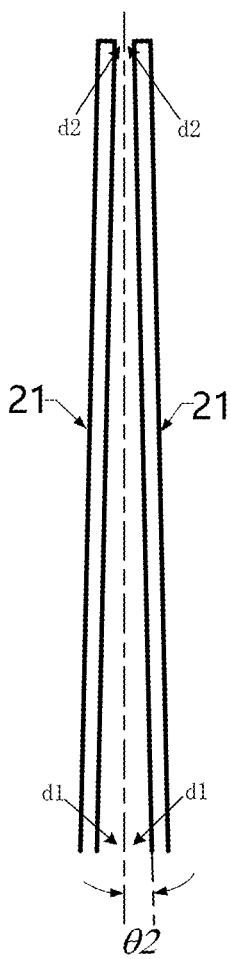
FIG. 3 is a section diagram of a wedge-shaped structure formed by two flat parts of the display panel in the folded state provided in the embodiment of the present disclosure.

FIG. 1 is a section diagram of a display panel in an unfolded state provided in an embodiment of the present disclosure; FIG. 2 is a section diagram of the display panel in a folded state provided in the embodiment of the present disclosure; FIG. 3 is a section diagram of a wedge-shaped structure composed of two flat parts of the display panel in the folded state provided in the embodiment of the present disclosure. As shown in FIG. 1 to FIG. 3, according to a first aspect, it is provided a display panel 02, and the display panel 02 includes two flat parts 21 and a bending part 22 connected to the two flat parts 21. The display panel 02 has a folded state. In the folded state, the bending part 22 is symmetrical about a first plane M. The flat parts 21 are symmetrical about the first plane M. A distance between an end of each of the flat parts 21 which is proximate to the bending part 22 and the first plane M is a first distance d1. A distance between an end of each of the flat parts 21 which is away from the bending part 22 and the first plane M is a second distance d2. The first distance d1 is larger than the second distance d2.

In the display panel 02 provided in embodiments of the present disclosure, a section shape of the bending part 22 is a water droplet shape, that is, the display panel 02 is a display panel of an inner folding type. When the display panel 02 is in the folded state, display surfaces of two parts divided by the first plane M are opposite to each other.

In some embodiments of the present disclosure, in the folded state, the section shape of the bending part 22 is the water droplet shape. Optionally, the display panel 02 is the display panel of the inner folding type. That is, in the folded state, the display panel 02 is equally divided into two folding display parts, and display surfaces of the two folding display parts are opposite to each other.

An inventor of the present disclosure discovers that when the two flat parts 21 connected to the bending part 22 with the water droplet section shape are disposed in parallel, an angle between a boundary of the bending part 22 and a boundary of each of the flat parts 21 changes greatly, thus causing an excessive shear stress between film layers in the display panel 02, and greatly increasing a peeling risk resulting in debonding and failure between film layers when the display panel 02 is folded. After an actual test, when the two flat parts 21 connected to the bending part 22 with the water droplet section shape are disposed in parallel, a misalignment distance d3 between film layers of the end, which is away from the bending part 22, of each of the flat parts 21 is above 500 microns (μm).

The distance between the end of each of the flat parts 21 which is proximate to the bending part 22 and the first plane M is larger than the distance between the end of each of the flat parts 21 which is away from the bending part 22 and the first plane M in embodiments of the present disclosure, thus the two flat parts 21 can form a wedge-shape structure. The wedge-shape structure formed by the flat parts 21 cooperates with the bending part 22 having a water droplet shape, so as to decrease the changes of the angle between the boundary of the bending part 22 and the boundary of each of the flat parts 21, reduce the shear stress between film layers in the display panel 02 when the display panel 02 is folded, and decrease the peeling risk resulting in debonding and failure between film layers in the display panel 02, which is beneficial for improving stability of the display panel 02. So, the maximum number of times that the display panel 02 is folded is increased, and a service life of the display panel 02 is prolonged.

Optionally, the misalignment distance d3 between the film layers of the end, which is away from the bending part 22, of each of the flat parts 21 is controlled below 250 μm.

In some embodiments of the present disclosure, in the folded state, the section shape of the bending part 22 with the water droplet shape includes an arc edge or a combination of the arc edge and a straight edge. Preferably, the section shape of the bending part 22 with the water droplet shape is composed of an arc edge or a combination of the arc edge and a straight edge.

In some embodiments of the present disclosure, the bending part 22 includes a main bending part 221 and two transition bending parts 222. Each of the flat parts 21 is connected to the main bending part 221 through a corresponding one of the transition bending parts 222. In the folded state, a section shape of the main bending part 221 is arc-shaped. Each of the transition bending parts 222 includes a straight portion 2221. An angle between the straight portion 2221 and the first plane M is a first angle $\theta 1$, an angle between each of the flat parts 21 and the first plane M is a second angle $\theta 2$, and the first angle $\theta 1$ is larger than the second angle $\theta 2$.

In the display panel 02 provided in embodiments of the disclosure, since the angle between the flat part 21 and the first plane M is smaller than the angle between the straight portion 2221 and the first plane M, a slope of the display panel 02 is more gentle after the transition bending parts 222 transition to the flat parts 21. When the display panel 02 is folded, the shear stress between the film layers in the display panel 02 is decreased, and the peeling risk resulting in debonding and failure between the film layers in the display panel 02 is reduced, which is beneficial for improving the stability of the display panel 02. So, the maximum number of times that the display panel 02 is folded is increased, and the service life of the display panel 02 is extended.

In some embodiments of the present disclosure, the first angle $\theta 1$ is in a range of 9 degrees (°) to 14°, and the second angle $\theta 2$ is in a range of 0.4° to 0.6°.

Figure 4A:
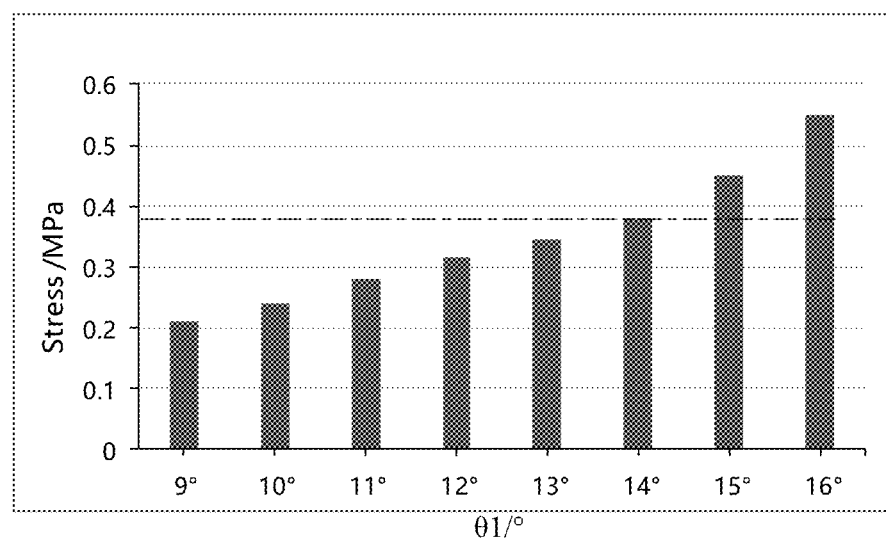
FIG. 4A is a schematic diagram of horizontal and vertical coordinates of a first angle and a shear stress between film layers provided in an embodiment of the present disclosure.
Figure 4B:
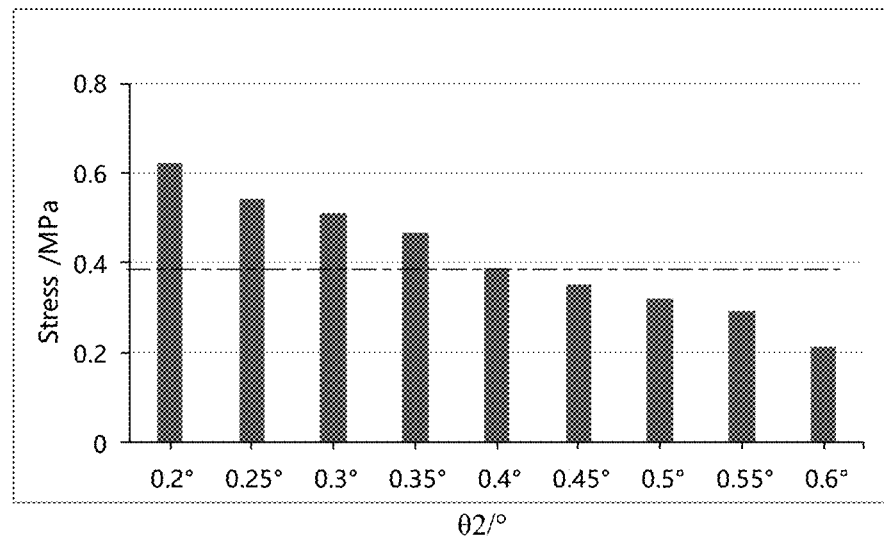
FIG. 4B is a schematic diagram of horizontal and vertical coordinates of a second angle and a shear stress between film layers provided in an embodiment of the present disclosure.

FIG. 4A is a schematic diagram of horizontal and vertical coordinates of the first angle $\theta 1$ and the shear stress between the film layers provided in the embodiment of the present disclosure; and FIG. 4B is a schematic diagram of horizontal and vertical coordinates of the second angle $\theta 2$ and the shear stress between the film layers provided in the embodiment of the present disclosure. As shown in FIG. 4A, with an increase of the first angle $\theta 1$, the shear stress between the film layers in the display panel 02 increases continuously, so that the peeling risk resulting in debonding and failure between the film layers in the display panel 02 increases continuously. The first angle $\theta 1$ is controlled in the range of 9° to 14° in embodiments of the present disclosure, so as to control the shear stress between the film layers in the display panel 02 below a threshold (i.e., a value corresponding to an alternate long and short dash line in FIG. 4A) of a peeling stress, and improve the stability of the display panel 02. As shown in FIG. 4B, with an increase of the second angle $\theta 2$, the shear stress between the film layers in the display panel 02 decreases continuously, so that the peeling risk resulting in debonding and failure between the film layers in the display panel 02 decreases continuously. The second angle $\theta 2$ is controlled in the range of 0.4° to 0.6° in embodiments of the present disclosure, so as to control the shear stress between the film layers in the display panel 02 below a threshold (i.e., i.e., a value corresponding to an alternate long and short dash line in FIG. 4B) of the peeling stress, and improve the stability of the display panel 02.

In some embodiments of the present disclosure, each of the transition bending part 222 further includes a first curving portion 2222 and a second curving portion 2223. The first curving portion 2222 is connected to the main bending part 221 and the straight portion 2221. The second curving portion 2223 is connected to the corresponding flat part 21 and the straight portion 2221. A bending center of the first curving portion 2222 and a bending center of the second curving portion 2223 are located at different sides of the transition bending part 222, respectively.

In the display panel 02 provided in embodiments of the present disclosure, the bending center of the first curving portion 2222 and the bending center of the second curving portion 2223 are respectively located at different sides of the transition bending part 222, which makes transitions of curving portions located at two sides of the straight portion 2221 smoother. Further, when the display panel 02 is folded, the shear stress between the film layers in the display panel 02 is decreased, and the peeling risk resulting in debonding and failure between the film layers in the display panel 02 is reduced, which is beneficial for improving the stability of the display panel 02. So, the maximum numbers of times that the display panel 02 is folded is increased, and the service life of the display panel 02 is extended.

In some embodiments of the present disclosure, the section shape of the main bending part 221 is a half round, and the bending center of the first curving portion 2222 is the same as a bending center of the main bending part 221.

In the display panel 02 provided in embodiments of the present disclosure, the bending center of the first curving portion 2222 is the same as the bending center of the main bending part 221, which makes a transition of the first curving portion 2222 and the main bending part 221 smoother. Further, when the display panel 02 is folded, the shear stress between the film layers in the display panel 02 is decreased, and the peeling risk resulting in debonding and failure between the film layers in the display panel 02 is reduced, which is beneficial for improving the stability of the display panel 02. So, the maximum number of times that the display panel 02 is folded is increased, and the service life of the display panel 02 is extended.

Optionally, a bending radius of the main bending part 221 is in a range of 1.5 millimeters (mm) to 2.5 mm. In the present disclosure, the bending radius of the main bending part 221 is in the range of 1.5 mm to 2.5 mm, which can decrease an overall thickness of the display panel 02 to achieve lightness and thinness. However, when the bending radius of the main bending part 221 is in the range of 1.5 mm to 2.5 mm, a bending radian of the second curving portion 2223 is larger, and the shear stress between the film layers in the second curving portion 2223 is beyond a controllable range. Therefore, in the present disclosure, the distance between an end of the flat part 21 which is away from the bending part 22 and the first plane M is less than the distance between an end of the flat part 21 which is proximate to the bending part 22 and the first plane M, so as to achieve a folding structure with both a water droplet shape and a wedge-shaped, thereby greatly reducing a probability of a potential peeling risk resulting in debonding and failure between the film layers in the display panel 02.

In some embodiments of the disclosure, the main bending part 221 includes a first supporting layer BP1, each of the transition bending parts 222 includes a second supporting layer BP2, and each of the flat parts 21 includes a third supporting layer BP3. The first supporting layer BP1, the second supporting layer BP2 and the third supporting layer BP3 are disposed on a same layer. Specifically, the first supporting layer BP1 includes multiple through holes K1, and the second supporting layer BP2 includes multiple grooves K2.

In the display panel 02 provided in the present disclosure, in the folded state, a bending radius of each of the flat parts 21 is infinite, a bending radius of any area of each of the transition bending parts 222 is smaller than the bending radius of each of the flat parts 21. In embodiments of the present disclosure, the second supporting layer BP2 defines multiple grooves K2 thereon, to decrease a shear stress between film layers in the transition bending parts 222, and reduce the peeling risk resulting in debonding and failure between the film layers in the display panel 02 in the folded state, which is beneficial for improving the stability of the display panel 02. So, the maximum number of times that the display panel 02 is folded is increased, and the service life of the display panel 02 is extended.

In the display panel 02 provided in embodiments of the present disclosure, in the folded state, the bending radius of the main bending part 221 is smaller than the bending radius of any area of each of the transition bending parts 222. In embodiments of the present disclosure, the first supporting layer BP1 defines multiple through holes K1 therein to decrease a shear stress between film layers in the main bending part 221, and reduce the peeling risk resulting in debonding and failure between the film layers in the display panel 02 in the folded state, which is beneficial for improving the stability of the display panel 02. So, the maximum number of times that the display panel 02 is folded is increased, and the service life of the display panel 02 is extended.

In some embodiments of the present disclosure, the first supporting layer BP1, the second supporting layer BP2 and the third supporting layer BP3 compose a supporting layer. The display panel 02 includes a first optical adhesive layer 201, a display panel body 202, a second optical adhesive layer 203, a polarizer 204, a third optical adhesive layer 205 and a protective cover plate 206, which are sequentially stacked on the supporting layer. Optionally, the supporting layer includes at least one of an organic supporting layer, an inorganic supporting layer or a metal supporting layer. The display panel body 202 includes an organic light emitting diode (OLED) light-emitting unit. The polarizer 204 has an anti-reflective function, so the polarizer 204 can be replaced with a color filter. The protective cover plate 206 is at least one of an organic cover plate or an ultra-thin glass.

Figure 5:
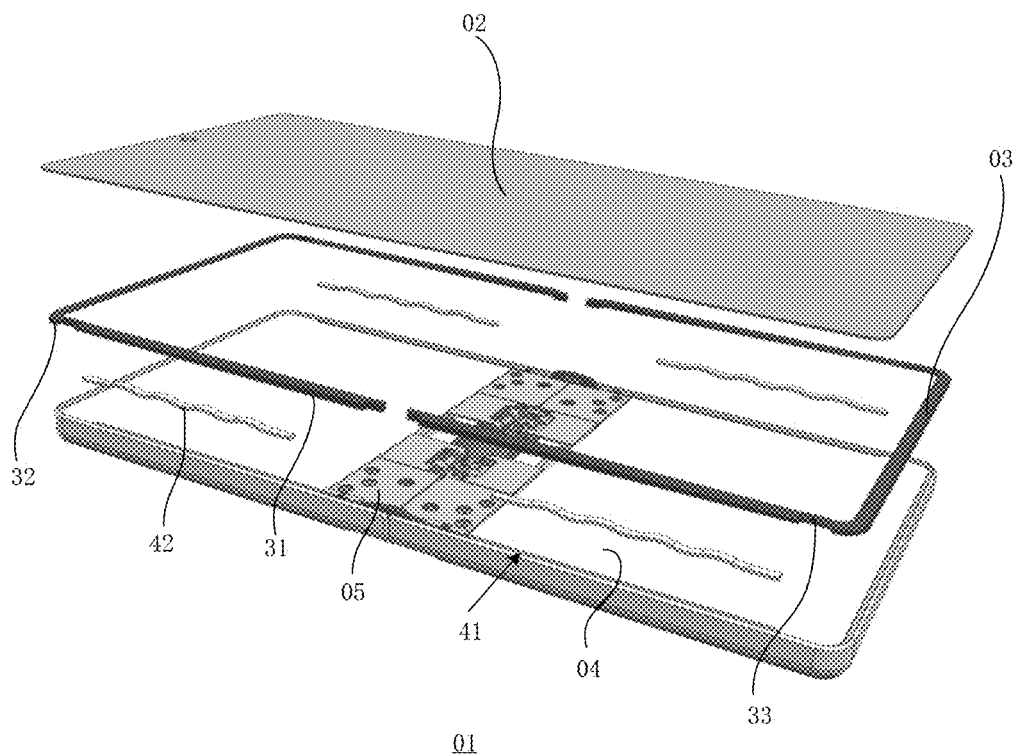
FIG. 5 is an assembly explosion diagram of a display device in an unfolded state provided in an embodiment of the present disclosure.
Figure 6:
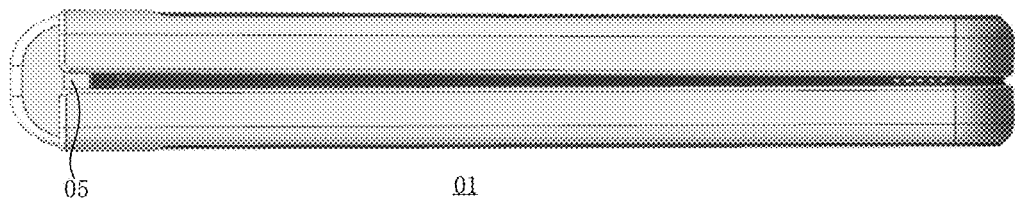
FIG. 6 is a schematic structural diagram of the display device in a folded state provided in the embodiment of the present disclosure.
Figure 7:
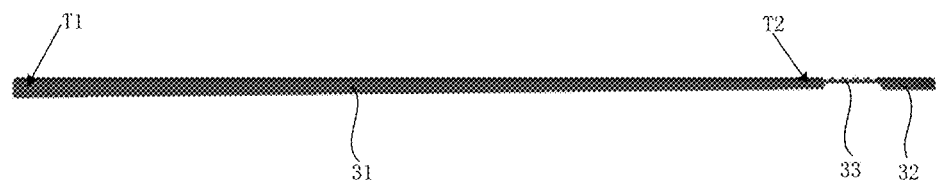
FIG. 7 is a section diagram of a front frame provided in the embodiment of the present disclosure.
Figure 8:
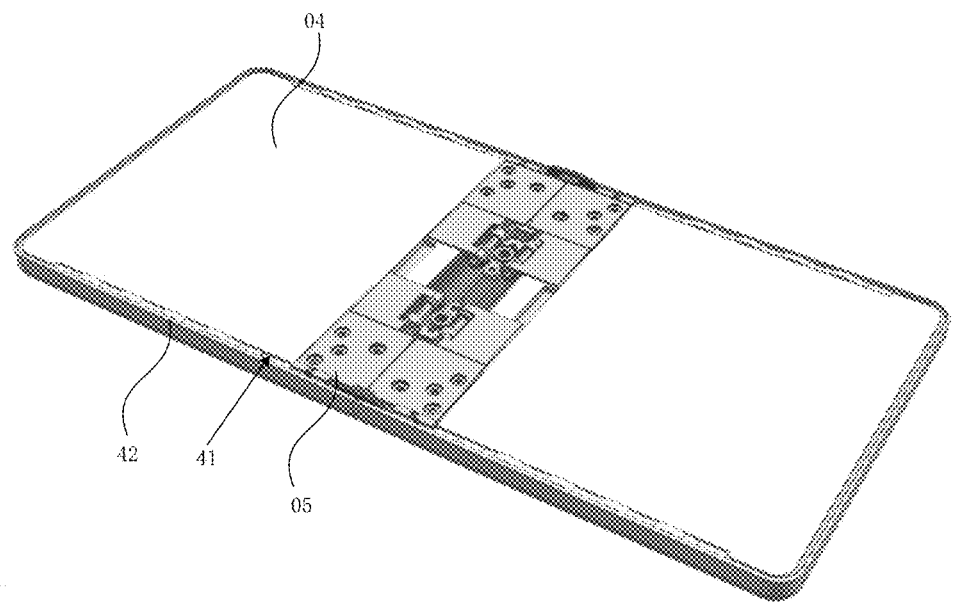
FIG. 8 is a schematic structural diagram of resilient supporting members accommodated in accommodation grooves provided in the embodiment of the present disclosure.

FIG. 5 is an assembly explosion diagram of a display device in an unfolded state provided in an embodiment of the present disclosure; FIG. 6 is a schematic structural diagram of the display device in a folded state provided in the embodiment of the present disclosure; FIG. 7 is a section diagram of a front frame provided in the embodiment of the present disclosure; and FIG. 8 is a schematic structural diagram of resilient supporting members accommodated in accommodation grooves provided in the embodiment of the present disclosure. As shown in FIG. 5-FIG. 8, according to a second aspect, it is provided a display device 01. The display device 01 includes anyone of the above display panels 02, and the display device 01 further includes two front frames 03 spaced apart. Each of the front frames 03 includes a first part 31. The first parts 31 is arranged to be overlapped with the flat parts 21. A thickness of an end of the first part 31 which is proximate to the bending part 22 is a first thickness T1, a thickness of an end of the first part 31 which is away from the bending part 22 is a second thickness T2, and the first thickness T1 is larger than the second thickness T2.

In the display device 01 provided in embodiments of the present disclosure, the front frames 03 are disposed on a display side of the display panel 02, and the first parts 31 overlap with the flat parts 21. When the display panel 02 is in the folded state, the two flat parts 21 can be spaced apart from each other through two first parts 31 to control sizes of the first distance d1 and the second distance d2. In embodiments of the present disclosure, the thickness of the end of first part 31 which is proximate to the bending part 22 is larger than the thickness of the end of the first part 31 which is away from the bending part 22, which can make the distance between the end of each of the flat parts 21 proximate to the bending part 22 and the first plane M larger than the distance between the end of each of the flat parts 21 facing away from the bending part 22 and the first pane M. When the display panel 02 is folded, the shear stress between the film layers in the display panel 02 is decreased, and the peeling risk resulting in debonding and failure between film layers in the display panel 02 is reduced, which is beneficial for improving the stability of the display panel 02. So, the maximum number of times that the display panel 02 is folded is increased, and the service life of the display panel 02 is extended.

In some embodiments of the present disclosure, a difference between the first thickness T1 and the second thickness T2 is equal to a difference between the first distance d1 and the second distance d2. Moreover, the display device 01 further includes a hinge 05. In the folded state, a thickness of the display device 01 gradually decreases in a first direction X, and the first direction X is a direction of the hinge 05 facing towards an edge of the display device 01.

In embodiments of the present disclosure, the difference between the first thickness T1 and the second thickness T2 is equal to the difference between the first distance d1 and the second distance d2, which can improve a match degree between the flat parts 21 and the first parts 31. When the display panel 02 is in the folded state, the two front frames 03 can closely fit to eliminate gaps therebetween, thereby preventing foreign objects and dust from entering, and thus protecting the display device 01.

Furthermore, in the folded state, the thickness of the display device 01 gradually decreases in the first direction X. Therefore, in embodiments of the present disclosure, the two flat parts 21 can form the wedge-shaped structure through the only two front frames 03. And, two display surfaces located on two sides of a bending shaft of the display device (e.g., a bending shaft of the hinge 05) are ensured to be in a same horizontal plane when the display panel 02 is in the unfolded state.

In some embodiments of the present disclosure, each of the front frames 03 further includes a second part 32 and a connection part 33. And, the first part 31 is rotatably connected to the second part 32 through the connection part 33.

In the display device 01 provided in embodiments of the present disclosure, a position relationship between the second part 32 and the display panel 02 is constant. The first part 31 is rotatably connected to the second part 32 through the connection part 33, so the first part 31 can have a certain freedom of movement when the display panel 02 is switched between the unfolded state and the folded state, which is beneficial for reducing difficulty of folding and unfolding, and improving user's experience.

Optionally, a material of the connection part 33 is a flexible stretchable material, and the connection part 33 is of a corrugated spacing groove structure, so as to further improve the freedom of movement of the first part 31 while ensuring a reliability of the first part 31.

In some embodiments of the present disclosure, the display device 01 includes middle frames 04, sides of the middle frames 04 facing towards the front frames 03 define accommodation grooves 41, the accommodation grooves 41 accommodate resilient supporting members 42 therein, and the resilient supporting members 42 are arranged to be overlapped with the first parts 31.

In the display device 01 provided in embodiments of the present disclosure, the resilient supporting member 42 are arranged to be overlapped with the first part 31. So, when the display panel 02 is switched between the unfolded state and the folded state, the resilient supporting members 42 in the accommodation grooves 41 can resiliently support the first part 31, buffer an impact force generated by instantaneous folding when the display device 01 is switched from the unfolded state to the folded state. Accordingly, user's folding feeling is improved, gaps are eliminated, and foreign objects and dust are prevented from entering, thus protecting the display device 01.

Optionally, a section shape of the resilient supporting member 42 is corrugated. In embodiments of the present disclosure, the resilient supporting member 42 is provided to be of a corrugated structure, thus the resilient supporting member 42 can have two states, i.e., reversible extension and contraction states, which is beneficial for improving the stability of the display device 01 in both the unfolded and folded states.

In summary, according to embodiments of the present disclosure, it is provided the display panel and the display device. The display panel has the folded state. In the folded state, the bending part is symmetrical about the first plane, and the two flat parts are symmetrical about the first plane. And, the distance between the end of each of the flat parts proximate to the bending part and the first plane is the first distance, the distance between the end of each of the flat parts facing away from the bending part and the first plane is the second distance, and the first distance is larger than the second distance. In the display panel and the display device provided in embodiments of the present disclosure, the distance between the end of each of the two flat parts proximate to the bending part and the first plane is larger than the distance between the end of each of the two flat parts facing away from the bending part and the first plane, thus the two flat parts can form a wedge-shaped structure. Further, a thickness of a side of the wedge-shaped structure proximate to the bending part is thicker, and a thickness of a side of the wedge-shaped structure facing away from the bending part is thinner. So, a shear stress between film layers in the display panel is decreased, and a peeling risk of film layers is reduced.

The display panel and the display device provided in the embodiments of the present disclosure are described in detail above, the principle and embodiments of the present disclosure are expounded by using specific examples in this paper, and the above description of the embodiments is merely used to help understand the methods and core ideas of the present disclosure. Meanwhile, for those skilled in the art, there may be changes in the specific implementation methods and application scope based on the ideas of the present disclosure. In summary, the content of the specification should not be understood as a limitation of the present disclosure.

What is claimed is:

1. A display device comprising a display panel, the display panel comprising:
   two flat parts; and
   a bending part connected to the two flat parts;
   wherein the display panel has a folded state, and in the folded state,
   the bending part is symmetrical about a first plane; and
   the two flat parts are symmetrical about the first plane, a distance between an end of each of the two flat parts which is proximate to the bending part and the first plane is a first distance, a distance between an end of each of the two flat parts which is away from the bending part and the first plane is a second distance, and the first distance is larger than the second distance;
   wherein the display device further comprises:
   two front frames spaced apart, each of the two front frames comprises:
   a first part arranged to be overlapped with a corresponding one of the two flat parts;
   wherein a thickness of an end of the first part which is proximate to the bending part is a first thickness, a thickness of an end of the first part which is away from the bending part is a second thickness, and the first thickness is larger than the second thickness.

2. The display device according to claim 1, wherein a difference between the first thickness and the second thickness is equal to a difference between the first distance and the second distance, and the display device further comprises a hinge; in the folded state, a thickness of the display device gradually decreases in a first direction, and the first direction is a direction of the hinge facing towards an edge of the display device.

3. The display device according to claim 1, wherein each of the two front frames further comprises a second part and a connection part, and the first part is rotatably connected to the second part through the connection part.

4. The display device according to claim 1, wherein the display device comprises middle frames, sides of the middle frames facing towards the two front frames define accommodation grooves, the accommodation grooves respectively accommodate resilient supporting members therein, and the resilient supporting members are arranged respectively to be overlapped with the first parts.

5. The display device according to claim 1, wherein in the folded state, a section shape of the bending part comprises an arc edge or a combination of the arc edge and a straight edge.

6. The display device according to claim 5, wherein the bending part comprises a main bending part and two transition bending parts, each of the two flat parts is connected to the main bending part through a corresponding one of the two transition bending parts, and in the folded state, a section shape of the main bending part is arc-shaped.

7. The display device according to claim 6, wherein in the folded state, each of the two transition bending parts comprises a straight portion, an angle between the straight portion and the first plane is a first angle, an angle between each of the two flat parts and the first plane is a second angle, and the first angle is larger than the second angle.

8. The display device according to claim 7, wherein the first angle is in a range of 9 degrees (°) to 14°, and the second angle is in a range of 0.4° to 0.6°.

9. The display device according to claim 7, wherein each of the two transition bending parts further comprises a first curving portion and a second curving portion, the first curving portion is connected to the main bending part and the straight portion, and the second curving portion is connected to the straight portion and a corresponding one of the two flat parts;

wherein a bending center of the first curving portion and a bending center of the second curving portion are located at different sides of the transition bending part, respectively.

10. The display device according to claim 9, wherein the section shape of the main bending part is a half round, and the bending center of the first curving portion is the same as a bending center of the main bending part.

11. The display device according to claim 9, wherein the main bending part comprises a first supporting layer, each of the two transition bending parts comprises a second supporting layer, each of the two flat parts comprises a third supporting layer, the first supporting layer, the second supporting layer and the third supporting layer are disposed on a same layer, the first supporting layer comprises a plurality of through holes, and the second supporting layer comprises a plurality of grooves.

12. The display device according to claim 9, wherein a misalignment distance between film layers of the end of each of the two flat parts which is away from the bending part is below 250 microns (μm).

* * * * *